Patented Jan. 20, 1925.

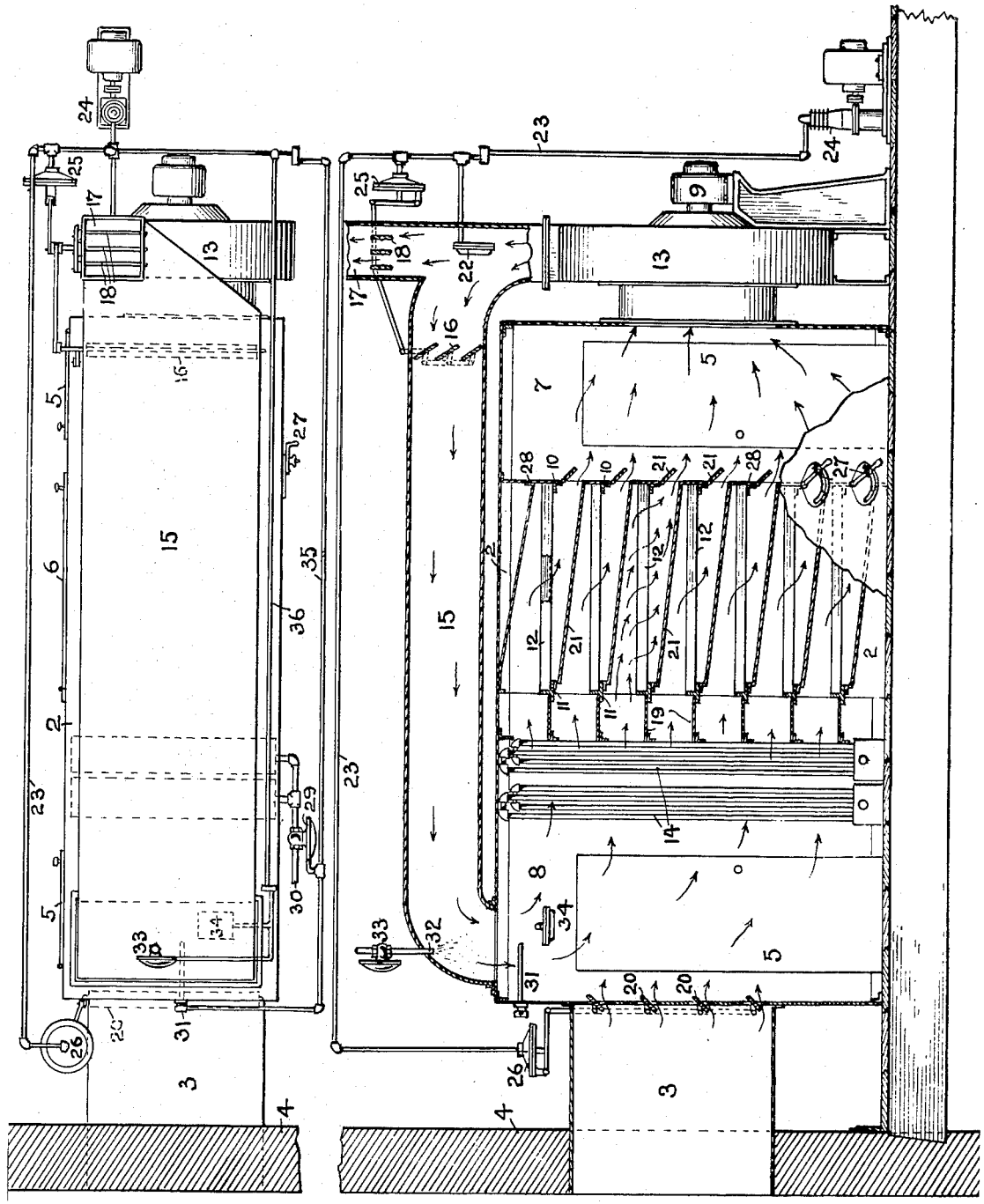

1,523,509

UNITED STATES PATENT OFFICE.

WILLIAM G. R. BRAEMER, OF CRANSTON, RHODE ISLAND, ASSIGNOR TO GENERAL FIRE EXTINGUISHER COMPANY, A CORPORATION OF NEW YORK.

DRIER.

Application filed January 24, 1923. Serial No. 614,548.

*To all whom it may concern:*

Be it known that I, WILLIAM G. R. BRAEMER, a citizen of the United States, and resident of Cranston, county of Providence, State of Rhode Island, have invented an Improvement in Driers, of which the following is a specification.

This invention relates to improvements in driers. More particularly, it relates to driers for material which, in a more or less subdivided or porous state, (including industrial products, chemicals, food products, and the like), is placed upon trays or other shallow receptacles within the drier to have its moisture withdrawn by evaporation induced by flow of a drying medium in contact with it. The speed of operation in apparatus of this sort is dependent upon the amount of moisture to be withdrawn, the ability of the drying medium to absorb it, and the ease with which the drying medium and the moisture in the materials have mutual access. All three of these factors are variables: The first is always variable because the moisture content is continuously changing, even to the end of a drying operation; the second may be regulated to a degree, and can be determined for any given instant, but tends to vary because of the tendency to increase the absolute humidity of the drying medium, and the temperature changes due to evaporation and to supplied heat; and the third varies according to the character of the materials to be dried and moisture content.

It is also an object of the present invention to accomplish the drying of a given charge more quickly, with less heat, and in a standardized manner; and to provide means by which the operation of drying is controlled automatically so as to proceed always under such efficient conditions as shall be predetermined by the person in charge, which conditions may be varied at will for different materials, or from time to time for the same material. The aims of the invention are attained by the circulating of the air or other drying medium, occasionally varying its make up in such manner as to improve its quality by replacing a portion with fresh air, but for the most part retaining and recirculating the drying medium with regular replenishment of its consumed heat and in some cases with humidity. The consequent saving and repeated use of its contained heat, measured quantitatively, makes a saving of heat units. When its percentage of humidity has risen to the predetermined point, the circulation is varied automatically so as to eject a portion of the overcharged body of air, and to replace it with a fresh body of air having a lower percentage of humidity. This change occurs automatically whenever the predetermined humidity condition of the drying medium is reached. To this end the apparatus comprises a compartment for holding the material which is to be dried, preferably in layers, over or through which the drying air medium passes; an enclosure for holding and circulating the drying medium, usually air; means for circulating the medium; means operating for emitting all or part of the medium at intervals when surcharged with moisture; and in the latter case for simultaneously admitting or drawing in a fresh charge of the medium (air) substantially equal to the quantity emitted, to be mixed with the recirculated medium commensurate with the capacity of the circulating space, automatic means being provided for controlling said emission and admission. Incidentally, said controlling means may operate for detecting the conditions whose occurrence are to be the occasion for actuating said means.

For illustrating the invention, it is herein assumed that the condition which occasions a change is the occurrence of a certain degree of relative humidity in the drying medium, and, therefore, a specific type of controlling apparatus which responds to increase of relative humidity is indicated for the control. This controlling apparatus is arranged at a particular location so as to detect occurrence of the predetermined condition and thereupon, through the apparatus which it controls, to cause the opening of damper means for the emission or escape of the moist circulating medium and of other damper means for the admission of fresh circulating medium and at the same time retarding the recirculation between said sets of damper means; or, in the absence of its detecting such condition, for temporarily closing or substantially closing the said damper means and simultaneously opening another damper means to a greater extent to facilitate the recirculation of the drying medium. To the usual enclosure for the material which is to be dried, and means for circulating the drying medium through it, the invention adds a detecting instrument, such as a hygrostat, so located as to be bathed in the moist circulating medium which has come from the material, said hygrostat being in position to be operated either for causing recirculation or for emission according as the conditions of the apparatus shall determine. For the emission, a damper means is provided, such that the contained medium either recirculates repeatedly or is ejected, while an equal volume of fresh medium is drawn in until the condition of the medium has the desired qualities, whereupon said damper means is closed and another damper, already partially open, is opened more fully for increasing the circulating volume of the medium in which the instrument finds the desired quality. The flow of heat from a radiator or heating coils employed, promptly creates in the fresh medium a condition of desired low relative humidity, by raising its temperature, and should maintain said temperature to the recirculation medium, notwithstanding its work of evaporation which continually tends to cool it. It may easily be arranged so that the heat supplied to the drying medium through the radiator or coils shall be automatically regulated to provide the desired temperature, being reduced while the recirculation is occurring, and increased while the admission of fresh air is occurring, for example, under control of a thermostat which should increase or reduce the heat imparted to the medium by the radiator, whether by varying the heat of the radiator or by-passing the air, according as the temperature of the drying medium leaving the radiator is low or high with respect to predetermined limits.

Hitherto, so far as I am aware, regulation and control have been but little solved, in respect to causing the drying medium to come into contact uniformly with all the moist material. The practice of merely forcing an abundance of dry air over or through the material, in the hope that enough air will ultimately reach each particle on every tray, does not reach all material at an equal rate, assuming it to be evenly distributed. It affects some only slightly. The air or drying medium thus wastefully flowing, increases the operative cost; and the space filled by that material, which gets dried in advance of the other portions, stands idle, delaying production, or even over-drys its material, without any recompense in the way of productive work done. To make a drier in which a minimum movement of drying agent, according to the drying rate that is desired, reach all particles of moist material approximately equally, so that all arrive at the desired state of dryness at the same time, and that preferably in as short a time as possible, is an aim of the present invention.

Among the objects of the present invention in its preferred form, is the provision of means whereby the maximum of space in the drying chamber and all parts of the current of drying medium will be utilized to effect uniform drying of the moist material. To attain such uniformity, it is an object of the invention to subject each particle of the moist material to contact with substantially the same amount of drying medium at equal velocity; and this to occur no matter where the particles of material are located in the drier.

The attainment of these objects is aided by spreading the material evenly in trays stacked vertically as heretofore customary, thus practically subdividing the drying chamber into a plurality of horizontally extending passages or compartments each containing a layer of the material that is to be dried. The problem then resolves itself into two parts: first, the attaining of equable drying as between all parts of the same tray, and, second, the attaining of equable drying as between trays situated in different parts of the enclosure. The invention attains the desired end by providing partitions between the successive layers, thus making actual separate compartments or passages, and by causing the drying medium, hereinafter assumed for convenience to be air, to pass through the layer of material in each compartment or passage. Further, uniformity is provided by sloping the upper partition wall of the passage from its entrance end, at a distance above the material, downward to the level of the material itself at the discharge end, and by sloping in parallelism the under partition wall downward from the level of the material, at the entrance of the passage, to a distance below the material at its discharge end. By this means all air passage through a passage is deflected through a horizontal stratum of moist material with more or less uniform distribution over the entire layer All of the air current between the adjacent oblique partitions must go through the layer of material; that which has once absorbed moisture from the material finds itself on the other side thereof and in a current moving away from it, instead of travelling along its surface and remaining in proximity to the same surface during the passage. With my improvement, the air which encounters the material at the remote end of the passage is not yet burdened with moisture to any material excess over that which goes through the material at the entrance of the passage. By regulating the flow of air within each compartment so that the drying therein is uniform throughout the layer, it only remains to make the action in any compartment like that in any of the other compartments, which may be done by means (including valves) hereinafter described.

One embodiment of the invention is shown in the accompanying drawing; but it will be understood that variations may be made in many respects. It is intended that the patent shall cover, by suitable expression in the appended claims, whatever features of patentable novelty, pertinent to the above stated subject matter and objects, exist in the invention disclosed.

Referring to the accompanying drawings: Fig. 1 is an elevation of a compartment drier embodying the invention, more or less in diagram; and Fig. 2 is a plan of the same.

Referring to the drawings, 2 indicates a compartment wherein there are means for holding the material that is to be dried, which, in the example shown, comprises a series of trays 12 which may be placed upon and supported by ledges 11, and wherein there is also means, such as a blower 13, for circulating a drying medium which, in the present case, is assumed to be air. Steam heating coils 14 or other heat radiating means are provided over which the air may pass on its way to the material on the trays 12; and the whole is organized with a return passage 15, so that air may be drawn by the blower 13 over the heating coils 14 in contact with the materials that are to be dried in the trays 12, and forced along through the return passage 15 to a compartment 8 whence it again is drawn by the blower in contact with the heating coils 14. For the control of the circulation, there is a discharge conduit or branch in the passage, for discharge of air from the fan, one branch being the return passage 15 with damper 16 therein and the other branch being an outlet 17 to atmosphere for emission of air and in which there is a damper 18. The air space from which the blower draws air, immediately preceding its contact with the coils or radiator 14, is supplied with air from the return passages 15 for recirculation and also with air from the atmosphere controlled by damper 20, which, when open, admits air from the outside atmosphere through conduit 3. Preferably, the openings at the damper 20 are of somewhat larger area than the discharge area of the passage 17, so that outside air which is not in motion can be taken in at a low rate of speed and gradually accelerated to the predetermined speed of circulation which is characteristic of the apparatus.

Adjacent to the alternative passages 15 and 17 is an apparatus indicated diagramatically at 22 for detecting the condition of the drying medium at that location and operating to control said condition. This may be an air condition detecting apparatus, such as a hygrostat, or humidity controller. It is arranged to control a power system herein indicated as operated by compressed air from a suitable air compressor indicated diagrammatically at 24, and combined with apparatus such as diaphragm motors 25 and 26 to operate the dampers 16 and 18 and 20, the compressed air being supplied from the compressor to the motors by pipes 23. Other means of power control may, however, be employed, the means shown being considered as typical of one character of power control and being merely diagrammatic and by way of example only.

Referring more particularly to the means for directing the drying medium over the materials to be dried, the chamber 2 is divided horizontally into a stack of passages arranged one above the other and each containing a tray 12, thus utilizing all the vertical extent of the drying chamber. Plates 19 constituting partitions between the passages extend horizontally across the chamber, away from the T bars 11 and toward the heating coils 14. The vertical range of T bars 11 are set at a distance from the heating coils 14 sufficient to diminish greatly the effect of radiant heat from the coils upon the moist material. From these bars 11, which are illustrated as being of inverted T cross section, the plates 19 extend horizontally to cut off oblique radiant heat rays from the coils. In the opposite direction, being in the direction of flow of heated air, partitions 21 slope from the T bars 11 gradually downward for a distance equal to the width of the trays 12, or other receptacle used, to their support at their other ends upon angle cross bars 10. These latter ends of the partitions are a little above the tops of the trays 12 where they rest on the angle bars 10, and there the partitions turn vertically downward at 28 and connect with said angle bars. The depending portions 28 are in the same vertical plane and in effect constitute a partition with transverse openings, which open into a large chamber 7 from which the blower 13 exhausts the circulating drying medium. These transverse openings are each provided with a damper or valve 21, which when swung downward, closes the end of the particular passage, but which normally is open to a pre-arranged degree, according to the relative volume of flow of air which is desired through the particular passage. Starting from the heating coil, each compartment or passage, therefore, comprises, first, a short horizontal passage, then a sloping passage with parallel downwardly inclined transverse walls, leading to the suction chamber 7, and opening into it to a variable extent as determined by the adjustable damper or valve 21.

In each of these sloping passages a tray 12 loaded with material to be dried is placed, said tray being horizontal, with its edge which is toward the coil substantially on a level with one of the horizontal plates 11, and just at the beginning of one of the sloping partitions. The other edge of the tray is against the fixed portion 28 of the vertical wall and supported by one of the transverse angle bars 10. If the longitudinal section of the sloping portion of the passage, between partitions, be considered a parallelogram, the tray may be described as in a horizontal line diagonally arranged between the opposite corners. It, therefore, crosses the passage. The tray is of grid or equivalent design, having a foraminous bottom, with openings too small to permit passage of the material, but sufficiently large to allow the air to pass freely.

Each of the dampers or valves 21 is provided with a rod extending outside the drier casing and having a handle 27 for adjusting the damper. The handle 27 may be clamped to a suitable sector plate 27$^a$, whereby it may be locked in any desired position, and thus to determine and control the volume of air drawn through the passage and tray. It will be seen that by setting each damper 21 suitably, according to the draft, where it is located, it is possible to effect uniform volumetric flow of drying medium through the various trays. The setting of a damper 21 determines the size of the exit of a passage, and this, in turn, enables the quantity of flow through such passage to be varied, as desired. In consequence, the quantity of air drawn through each passage and tray 12 can be made equal, even though the suction of the blower 13 at the exit ends of the passages varies, according to the distances from the regions of greatest draft. The correct settings of the several dampers can be readily ascertained by experiment and when once determined, will be constant as long as the capacity of the blower remains unchanged.

Having set the dampers 21 so that the equal quantities of drying medium will flow through each space or passage containing a tray, it is obvious that the same equal quantities will flow through the steam coils 14 into the entrance spaces to the passages and provided by plates 19. Since the coils extend uniformly across each such entrance spaces, each quantity of air entering a passage will be subjected to the same heat treatment and thus be uniform in temper and absorptive capacity. Under such conditions of uniformity in the character of the air, and in the quantity which passes through each tray, the drying of all the material will proceed at the same rate and reach completion at substantially the same moment.

It may be desirable when drying different kinds of material to alter the rate of flow of the drying medium. This can be easily accomplished by resetting all the dampers, to the end that a greater or less amount of air will pass through the material and this is possible without changing the relation between these amounts, namely, that of equality.

The invention, therefore, enables the entire charge of material throughout a drying chamber to arrive at the desired point of dryness at substantially the same moment, and saves time and expense heretofore wasted in continuing the drying process beyond the point when the drying of part of the material on any one tray is complete, either on the same tray or elsewhere in the chamber in order to further dry the remainder.

The general movement of the air body coming from the heating coils 14 may be assumed to occur along lines of least resistance, starting in a horizontal direction between the plates 19. The topmost stratum of particles of such air, upon striking the sloping top wall 21, will be deflected thereby and thence will continue onward substantially parallel thereto. The deflection of this top stratum changes the direction of flow of the stratum next below it, and this, in turn, alters the course of its neighboring stratum, and so on, until the effect is felt by the lowermost stratum. This is crowded into and through the moist material at the very beginning of the tray. Each succeeding stratum as it reaches the material at the point to which its altered direction of flow brings it, will in turn pass downward through the material, until ultimately the topmost particles of air will pass through the tray at its remote end from the passage entrance. After permeating the material and picking up moisture, the air body continues its flow toward the exit, increasing in depth below the tray as its depths above the tray decreases. This flow may be expected to occur, with evenness of distribution over the whole tray in proportion to the evenness with which the material is spread over the whole tray. Care being taken to distribute the material evenly, there is such a short passage of air through it that the middle and bottom layers dry practically as rapidly as the upper. In consequence, the drying proceeds uniformly throughout the whole tray charge, and the material therein all becomes ready for removal simultaneously, without a part being ready long before the remainder.

Although the walls 21 are shown as sloping downward in the direction of flow, I do not restrict myself in this respect, it being only necessary that they shall be so arranged that they will perform their function of diverting the current of air through the material. The practical arrangement of the base support for the coils 14 makes it advantageous, in utilizing the space of the drying chamber, to set the walls for sloping downward, as shown. Furthermore, these walls 21 need not be fixed within the drier. They may be part of the structure of a truck, suitably designed and proportioned so that when rolled into the drying compartment, the entrance end of the sloping passages between partitions thereon corresponding to partitions 21 will register with the spaces between the plates 19 and with the plates 28 and dampers 21. In this case, the truck can be fully loaded at a convenient place elsewhere in the establishment, before being placed in the drier, and a truck load of dried material can be withdrawn and unloaded elsewhere. A quick change of all the material can be thus effected. The general use of trucks of this type is well known and shown for example in Letters Patent No. 1,284,218 of 1918, and will need no further reference.

In the foregoing specification, reference has been made to the drying medium as being heated by the heating coils 14 and also as absorbing moisture from the materials held in the trays 12, the said change in its hygrometric condition affecting at intervals the humidity controlling means or hygrostat 22. It is to be understood, however, that the temperature of the circulating air or drying medium may be maintained constant or substantially so by any temperature control system in use; and by way of example, one means is shown. The supply of steam to the heating coils 14 is controlled by a pipe 30 having therein a diaphragm motor valve 29 which is operated by compressed air supplied from compressor 24 by pipes 31, the operation being such, that when the temperature of the circulating air is too warm, the thermostat causes the motor valve 29 to close off the steam supply to the heating coils 14, and vice versa. In this manner, the temperature of the drying medium may be maintained substantially constant and at a predetermined degree.

Similarly, the humidity of the air may be maintained at a maximum desired, where the materials being dried do not supply sufficient moisture to enable the hygrostat 22 and damper system to insure such conditions; and this may be accomplished by supplying the circulating air with moisture from other sources than the materials being dried. The means for this purpose, which I have shown by way of example, consists of a vapor or water spray pipe or nozzle 32 discharging preferably into the return conduit 15 where it enters the chamber 8 containing the heating coils, said nozzle controlled by a motor valve 33 actuated by compressed air supplied from the compressor 24 by pipes 23 and 36, said motor valve controlled by a humidity controller or hygrostat 34 arranged preferably in the said chamber 8, whereby it may be affected by the air before being raised in temperature. I, however, do not restrict myself as to the position of the spray nozzle and humidity controller, as with proper adjustments they may be arranged at any place desired. The humidity controller 34 responds for a deficient humidity condition whereas controller 22 responds for the presence of an excess of humidity. They may, therefore, both be employed in the drier apparatus at the same time.

The provision last referred to, namely, of maintaining a humidity condition within the drying apparatus which shall remain substantially constant, is especially useful in cases involving the drying of ceramic ware, for example, and it is evident that without the provision of increasing the humidity in case of excessive dryness of the air, it would not be possible to maintain a constant humidity, and this is especially the case where the articles are of themselves incapable of supplying the necessary additions of moisture to compensate for loss of moisture due to moisture laden air which might escape from the drying apparatus. By providing the means set out for reducing and preventing an excess of humidity as provided under the control of the hygrostat 22 and, at the same time, providing means for increasing the humidity under the control of the hygrostat 34, it is evident that the humidity of the circulating medium may be maintained constant under all conditions. It will also be understood that in place of the particular spraying nozzle 32 for increasing the humidity, the proper relative humidity within the drier may be maintained by controlling the humidity of the air entering the chamber by first treating it in an ordinary air washer provided with automatic humidity control means of the type commonly employed in connection with air washers, but with the hygrostat located in the drying chamber, as at 34.

The discharge from the blower 13 may be conducted largely or wholly away from the drier if the damper 18 is set as illustrated, in which case fresh air is permitted to enter through the openings of a damper 20, provided in the entrace conduit 3. Or, by closing both dampers 20 and 18 and fully opening a damper 16, controlling a by-pass or return duct 15, the drying medium may be returned and recirculated again and again from the blower to the entrance chamber 8. The air compressor 24 and piping 23 therefrom to diaphragm motor units 25 and 26 connected with the several dampers, constitute a system adapted to shift the dampers, automatically, upon the actuation of the system caused by a control unit 22 responsive to predetermined change of condition, e. g. humidity, of the drying medium.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:—

1. A drier comprising, in combination, an enclosure having a section adapted to contain materials to be dried, an entrance chamber at one end of said section, a discharge space at the other end thereof, a blower for exhausting a drying medium from said entrance chamber and moving it in contact with the materials to be dried and thence into the discharge space, a passage connecting the discharge side of the blower with said entrance chamber, flow directing means controlling the movement of the drying medium whereby all of it may be recirculated through said passage to the entrance chamber for recirculation in contact with the material to be dried or part of it discharged from the pressure side of the blower into the atmosphere, means for supplying a fresh medium to the entrance chamber in equal amount to that discharged, and means for actuating said flow directing means responsive to condition changes of the medium in circulation.

2. The invention according to claim 1, wherein further, the section which contains the material to be dried is formed of a plurality of passages respectively containing trays for holding the material and through which the medium passes, a heater is provided in the entrance chamber and extending for the full height and width of the section, and horizontal devices provided which extend from the heater to the plurality of passages whereby the drying medium which passes through any passage is first caused to pass in contact with a given area of the heater so that the condition of the drying medium acting upon the material is uniform in its temperature.

3. A drier comprising, in combination, an enclosure having an entrance chamber with an inlet opening and a drying chamber adapted to contain materials to be dried, a blower on the discharge side of the drying chamber for sucking the drying medium from said entrance chamber through the drying chamber in contact with the material therein to be dried, a recirculating passage communicating with the pressure side of the blower and the entrance chamber and also having a discharge branch opening into the atmosphere, control apparatus for directing the flow of the drying medium comprising dampers of large area transverse of the passage for controlling a large flow of the drying medium for recirculation, dampers in relatively smaller area for the inlet and discharge passages the discharge branch passage and its damper arranged intermediate of the blower and the large dampers in the recirculating passage, operative means for said dampers for closing the recirculating damper simultaneously with opening of the inlet and discharge dampers and vice versa, and means responsive to changes in the condition of the drying medium for controlling the operative means of the various dampers for regulating the entrance of fresh medium and discharge of a corresponding amount of the recirculated medium.

4. A drier comprising, in combination, a passage having its top and bottom walls oblique to the horizontal, means for moving a drying medium through said passage, a foraminous tray for holding material to be dried supported in a substantially horizontal position across said passage and arranged with respect to said sloping walls to divide said passage into tapering sections of similar shape on opposite sides of the tray, the tapering section on the approach side of said tray converging toward the material and the tapering section on the other side of said tray being divergent therefrom, an approach passage extending from the tapering section on the approach side of the foraminous tray, and a heater arranged close to the entrance end of the approach passage for heating the circulating drying medium.

5. A drier comprising an enclosure having a plurality of compartments arranged in parallel and each adapted to contain a mass of material to be dried, means for moving a drying medium through all the compartments simultaneously, and means controlling the quantum of flow of said medium through each compartment individually whereby the respective volumes of flow may be adjusted so that the drying effect in each one is equal to that in each other.

6. A drier comprising an enclosure having compartments arranged in parallel and each adapted to contain a mass of material to be dried, means for moving a drying medium through all the compartments simultaneously, and means comprising a damper for each compartment adapted to vary the size of its exit opening to control the flow of said medium through the compartment, whereby the drying effect in each may be made equal to that in each other.

7. A drier comprising a plurality of passages arranged in parallel and each adapted to contain a mass of material to be dried, combined with means for moving a drying medium through all the passages simultaneously, each passage having sloping walls and foraminous material-holding means crossing it from wall to wall therewith, and each passage having means for controlling the flow of drying medium through it, whereby the drying effect on the various masses can be made of equal rate.

8. A drier comprising a plurality of passages arranged in parallel each adapted to contain a mass of material to be dried, combined with means for moving a drying medium, there being means for varying the flow through each passage to produce equality of rate as between passages, and means adapting each passage to distribute the flow therein uniformly over the material-holder therein contained, whereby all of the contents of all of the passages are dried at uniform rate.

9. A drier comprising an enclosure having compartments therein arranged one above the other throughout the vertical extent of the enclosure and each adapted to contain material to be dried, means for moving a drying medium through the enclosure, heating means extending across the enclosure on the approach side of the compartments for heating the said medium, plates arranged between the heating means and the compartments, forming an entrance passage to each, and adapted to direct oblique rays of radiant heat to each compartment into horizontal rays whereby the drying medium enters the compartments uniformly throughout the enclosure.

In testimony of which invention, I hereunto set my hand.

WILLIAM G. R. BRAEMER.